(12) United States Patent
Kulak

(10) Patent No.: US 7,035,885 B2
(45) Date of Patent: Apr. 25, 2006

(54) MACHINIST CALCULATING APPARATUS

(76) Inventor: John A. Kulak, 235 Ridge Rd., Bangor, PA (US) 18013

(*) Notice: Subject to any disclaimer, the term of this patent is extended or adjusted under 35 U.S.C. 154(b) by 597 days.

(21) Appl. No.: 09/802,713

(22) Filed: Mar. 9, 2001

(65) Prior Publication Data

US 2001/0049708 A1 Dec. 6, 2001

Related U.S. Application Data

(60) Provisional application No. 60/188,051, filed on Mar. 9, 2000.

(51) Int. Cl.
*G06F 3/00* (2006.01)

(52) U.S. Cl. ..................................................... 708/145

(58) Field of Classification Search ................. 708/131, 708/134–137, 144–146
See application file for complete search history.

(56) References Cited

U.S. PATENT DOCUMENTS

| | | | | |
|---|---|---|---|---|
| 4,845,652 A | * | 7/1989 | Bunsen | 708/144 |
| 4,852,057 A | * | 7/1989 | Patton | 708/136 |
| 4,885,714 A | * | 12/1989 | Eisenstein et al. | 708/131 |
| 4,972,322 A | | 11/1990 | Asakura et al. | |
| 5,007,008 A | * | 4/1991 | Beers | 708/145 |
| 5,020,012 A | * | 5/1991 | Stockberger et al. | 708/144 |
| 5,050,115 A | * | 9/1991 | Matsuda et al. | 708/137 |
| 5,067,102 A | * | 11/1991 | Eisenstein | 708/136 |
| 5,138,566 A | * | 8/1992 | Comforti | 708/137 |
| 5,245,536 A | * | 9/1993 | Hsieh | 708/134 |
| 6,748,404 B1 | * | 6/2004 | Chen et al. | 708/136 |

* cited by examiner

Primary Examiner—Tan V. Mai
(74) Attorney, Agent, or Firm—Sanford J. Piltch, Esq.

(57) ABSTRACT

A hand-held calculating apparatus for solving a plurality of formula-related calculations and conversions commonly encountered in the machinist trade having a visual display and a keyboard including key groupings denominated as basic arithmetic and memory, function and conversion, timing and clear and on/off keys. The function and conversion key grouping permit a user to automatically convert among dimensional measurements in different systems while continuing to utilize an earlier calculated result in the present calculation.

4 Claims, 1 Drawing Sheet

MACHINIST CALCULATING APPARATUS

This application claims benefit of Provisional 60/188,051 filed Mar. 9, 2000.

FIELD OF THE INVENTION

The present invention relates to a novel calculator having a plurality of functions that rely on stored equations, conversion factors and a unique prompting format specifically designed towards machinists and the like.

BACKGROUND OF THE INVENTION

Hand-held calculators that are capable of solving formula related problems without requiring users to consult cumbersome tables, references or memorizing equations are virtually non-existent. The present invention eliminates the need to rely on slide rules and reference cards, such as those provided by tooling companies, or by machinist's handbooks. While these devices provide the required information, the machinist user often has to carry several different types of cards corresponding to the information desired, or reference several different tables in the handbook. Not only does this waste time, it also greatly increases the likelihood of human error.

Additionally, the machinist user often still has to convert between metric and English systems to even use the slide rules as well as reference several equations before obtaining the desired answer. The present invention overcomes these considerable setbacks by providing the machinist user with an apparatus that prompts the user for data, easily converts between systems and calculates several equations without the user needing to consult reference cards.

The present invention also overcomes the drawbacks associated with such calculator models as the Pocket Handyman IV made for carpenters and sold by SEARS which merely serves to convert between metric and English systems. This model does not have built-in formulas nor does it provide the unique prompting format that the present invention does for the machinist trade. It is, therefore, an object of the present invention to provide an apparatus capable of solving a plurality of formula-related problems specifically in the machinist trade. It is also an object of the present invention to provide an apparatus with a unique prompting format which overcomes the prior need to memorize formulas in order to obtain calculated values for frequently utilized information.

In addition to providing a plurality of formulas, it is a further object of the present invention to provide an apparatus that is capable of working as a standard math calculator, a conversion center among all common dimensional units, a timer and includes a power-saving automatic shutoff function.

Other objects will appear hereinafter.

SUMMARY OF THE INVENTION

An apparatus is described for solving a plurality of formula-related problems commonly encountered in the machinist trade. This calculating apparatus is designed to replace a number of machinist conversion tables and cards currently in use and allow the machinist to instantly, upon entry of the appropriate numerical parameters and the selection of the correct function, view the display with the conversion or equivalent value. The apparatus is comprised primarily of a key board, a standard liquid crystalline display (LCD) with means to display alpha numeric letters and numerals simultaneously, both housed in a case which also houses two 3V button cells.

The keyboard contains several different types of keys including on/off, timing and clear keys, function and conversion keys, as well as basic arithmetic and memory keys. The conversion keys allow the user to quickly and accurately convert between feet, inches, meters and millimeters. The user can also easily convert between fractions and decimals.

The keyboard is equipped with basic arithmetic functions that allow the user to add, subtract, multiply and divide in addition to obtaining the square root and taking the percentage of numbers. The user can also utilize memory keys that have the ability to store the result obtained from one equation/function for subsequent use in another equation or function, thereby effectively eliminating the need to record intermediate answers and decreasing the probability of human error in the process. The user also has the option to recall stored data in order to modify or delete the data to obtain a different result.

The present invention is more easily described as a method for solving a plurality of formula-related function calculations and conversions commonly encountered in the machinist trade which include the steps of providing a hand-held calculating apparatus having a visual display and a keyboard including one or more key groupings for selecting a specialized function for calculation, depressing one of a plurality of function keys to initiate the selected function for calculation, causing one or more user prompts to appear on a visual display in a predetermined sequence for said selected function calculation, manually entering numerical information required for the selected function calculation in response to said user prompts and temporarily storing said numerical information, calculating said selected function using said temporarily stored numerical information, and displaying a numerical result for said selected function.

This method may also include the additional steps of providing one or more memory locations for storing the numerical result of a selected function calculation and selectively storing said numerical result for said selected function calculation in one or more memory locations for later recall. Another inclusion in the method may be the additional steps of reviewing previously entered numerical information required for the selected function calculation, checking the accuracy of said numerical information for the current function calculation, and modifying the numerical information as may be necessary for use in calculating the selection function calculation. Still another inclusion in the method may be the additional step of prompting the user by displaying a special character when previously stored numerical information is of the same type information required for use with the selected function calculation and recalling previously temporarily stored numerical information of the same type for use in the selected function calculation.

The method may also include the additional step of converting numerical information to be entered for use in the selected function calculation or numerical results of the selected function calculation between and among English and metric dimensional measuring systems and decimal and fractional values of said numerical information. The method includes the selection of the function calculation from the group of formula-related functions consisting of revolutions per minute RPM, surface feet per minute SFM, inches per minute IPM, feed per tooth FPT and cut-time CT.

The present invention is particularly distinct because of the unique prompting format it uses in conjunction with specialized function keys. Because these functions prompt the user to enter either new or stored information for each variable in the equation and then calculate the answer instantly, the prior setback of having to memorize equations and consult slide rules and tables is eliminated. The handheld calculating apparatus is equipped with the most frequently utilized equations including revolutions per minute RPM, surface feet per minute SFM, inches per minute IPM, feed per tooth FPT and cut-time CT. The unique prompting format, function keys and conversion ability in combination with memory capabilities allow the user, for the first time, to easily compute desired answers quickly and accurately.

BRIEF DESCRIPTION OF THE DRAWINGS

For the purpose of illustrating the invention, there is shown in the drawing forms which are presently preferred; it being understood however, that the invention is not limited to the precise arrangements and instrumentalities shown.

DETAILED DESCRIPTION OF THE PREFERRED EMBODIMENTS

Figure 1:
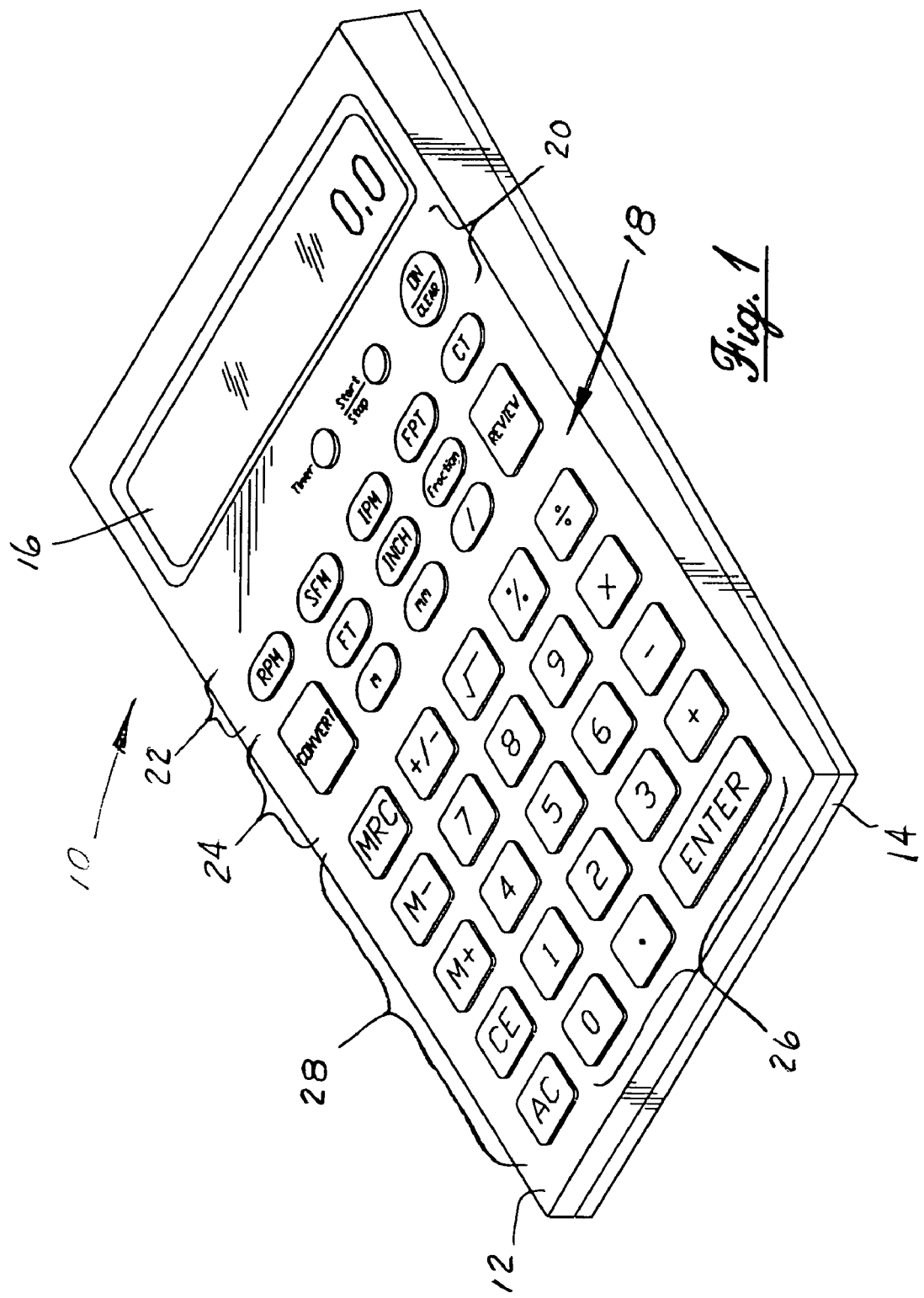
FIG. 1 is a perspective view of the specialty calculator of the present invention showing the several different function and equation keys provided by the apparatus.

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Referring now to the drawings in detail, where like numerals refer to like parts or elements, there is shown in FIG. 1 a specialty calculating device 10. The specialty calculator 10 is comprised of a top exterior casing 12 and a bottom exterior casing 14 that serve to connect the top and bottom of the apparatus into a single piece. The top exterior casing 12 contains liquid crystal display unit 16 which is capable of displaying alpha numeric characters, both numbers and letters, simultaneously.

Also included in top exterior casing 12 are several depressible keys generally 18, which, when depressed in appropriate sequence, will cause the specialty calculator 10 to calculate the requested functions. These key sets include ON/CLEAR and TIMER keys 20, special function keys 22, conversion keys 24, basic arithmetic operation and numeric entry keys 26, and memory storage and clear keys 28.

The keyboard 18, contains several different types of keys that correspond to the function the user wants to perform. The ON/CLEAR function in key set 20 is capable of providing a dual function. It provides the means to turn the unit on, and after the unit is on, it is used to clear all previous data entered and to clear the display for the next set of functions. The unit is also equipped with a power-saving automatic shut off device that de-activates the unit after three minutes of non-use unless the TIMER function is being utilized. If no keys are pressed for two minutes and thirty seconds, a warning will appear on the LCD 16 that the unit will shut off in thirty seconds. At the conclusion of three minutes, the unit will automatically shut-off, erasing all data previously displayed on the screen.

The apparatus also is equipped with a means to keep time. When the TIMER function in key set 20 is activated, the display 16 is set up to display the time in hours, minutes and seconds. The timer will begin to keep time when the START/STOP key is pressed once and will conclude keeping the time when the START/STOP key is pressed a second time. Pressing the CLEAR key once will return the display 16 to zero time and pressing it a second time will exit the TIMER mode.

The calculator contains basic operation functions in key set 26 for arithmetic. There are ×, +, −, ÷ and = keys for multiplication, addition, subtraction, division and totaling, respectively. There is also a % key for calculating percentages, a $\sqrt{}$ key for calculating the square root of the displayed number, and a +/− key for appointing the sign of a digit to either a positive or negative value. There are also keys corresponding to digits 0 through 9 and a "." (decimal point) key for non-integer numbers. The CE function in key set 28 clears the last entry displayed on the screen and the AC key clears all entries and allows the user to start a new set of functions. The M+ and M− keys store positive and negative values in memory storage and the MRC key recalls the value stored in memory after performing arithmetic functions.

The apparatus has several unique function keys that overcome the prior need to memorize lengthy equations, thus saving time and greatly decreasing the likelihood for human error. Because of its unique prompting format, these function keys are particularly useful to machinists, programmers, inspectors, estimators, and supervisors because they contain the complex formulas most frequently utilized in these professions. The first of said functions from key set 22 is the RPM key denoting revolutions per minute. The key automatically calculates the RPM using the following equation:

$$RPM = \frac{(SFM)(12)}{(\pi)(\text{Diameter})}$$

The apparatus prompts the user to input the diameter (using the numeric keys on key set 26) followed by the ENTER key which then prompts the user to enter the surface feet per minute SFM. After pressing the ENTER key the apparatus then automatically calculates the RPM and displays the value on the display 16. Since many of the calculated values obtained from these functions are utilized in other formulas the calculator provides, the apparatus is designed with a memory key to store data for later use. While the function result is displayed, the user can push the M+ key to add that data to the calculator's memory. The value can be recalled by the pressing the MRC key as described above. The displayed value can then be erased by pressing the CE key. During the use of machinist function keys, the last memory input supercedes the previous one and keeps the latest input in memory. Should the user wish to review the most recent function, the keyboard is equipped with a REVIEW key that allows the user to review and modify data previously entered.

The SFM function calculates the "surface feet per minute" using the following equation:

$$SFM = \frac{(\pi)(\text{Diameter})(RPM)}{12}$$

The user will be prompted to input the diameter (using the numeric keys in key set 26) followed by the ENTER key which will then prompt the user to enter the RPM. If the user has an RPM value in the memory an * will appear next to the RPM in the prompt. At this time, the user has the option of using the stored RPM by pressing the memory recall MRC key (located in key set 28) once, or ignoring it by pressing the MRC key twice to cancel the memory and enter new data. Another way to ignore the stored data, is to simply type in the data and press the ENTER key. The SFM is then calculated and flashes on the screen at which point the user has the option to store the data for later use by simply pressing the M+ key.

The specialty calculator 10 is also equipped with an IPM key which calculates the "inches per minute" using the following equation:

$$IPM = (RPM)(\text{No. of teeth})(FPT)$$

The user is prompted to input data for the "feed per tooth" FPT, No. of teeth and the RPM with the option to use any data that was previously calculated and stored in the memory. The answer value is then calculated using the equation and displayed on the display 16.

The calculator 10 can also calculate the "feed per tooth" using the following equation:

$$FPT = \frac{IPM}{(RPM)(\text{No. of teeth})}$$

The calculator 10 prompts the user to input data or use stored data followed by the ENTER key for "inches per minute" IPM, No. of teeth and the RPM. Using the equation, the calculator 10 then utilizes the data to obtain a value for the FPT.

The last function key in key set 22 is the "cut-time" CT key, which calculates the number of minutes it takes to cut using the following equation:

$$CT = \frac{LOC}{(FPR)(RPM)}$$

Again, the user is prompted to enter or used stored data for "length of cut" LOC, RPM, and "feed per revolution" FPR which the calculator 10 will then use to obtain the cut time in the same fashion as discussed above.

The calculator has the ability to quickly and easily convert between metric and English measurement systems using conversion keys in key set 24. For example, if the user wishes to convert six feet, 10 and 1/64 inches to millimeters, the number 6 is entered using the numeric keys in key set 26 followed by the FT key, enter 10 in the same way followed by the FRACTION key, then enter 1 followed by the "/" key and 64 followed by the INCH key. Then, the user, by pressing the CONVERT key followed by the MM key, causes the calculator 10 to convert the entered value into millimeters.

Conversions are made using the CONVERSION TABLE conversion factors listed in the below Table:

| |
|---|
| (INCH)(25.4) = MM |
| (MM)(0.03937) = INCH or (MM) ÷ 25.4 = INCH |
| (FEET)(0.3048) = METERS |
| (METERS)(3.281) = FEET |

Once a conversion is made, the answer values can continue to be converted between MM, M, FT, and INCHES by simply pressing the designated key in key set 24. If the answer value is in decimal form, the user may obtain the fractional value by simply pushing the FRACTION key, unless the value is in inch form, in which case the decimal is not equal to an exact fraction and cannot be rounded up to the nearest fraction. The inch in decimal point can be converted to a fractional inch value only when that fractional inch is $\frac{1}{2}$, $\frac{1}{4}$, $\frac{1}{16}$, $\frac{1}{32}$ and $\frac{1}{64}$. For example, if 0.25 is desired in fractional form, the user can input 0.25 INCH and then CONVERT INCH. The apparatus will then yield the corresponding fraction of ¼ inches.

The calculator also allows for basic arithmetic functions chosen from key set 26 including addition, subtraction, multiplication, division, obtaining square roots and taking percentages. The apparatus can easily handle fractions as well as positive and negative numbers. The ease with which this calculator converts between the two metric systems is particularly useful for long, chain calculations. Moreover, because this apparatus eliminates the need to memorize equations and write down intermediate answers during long, intricate equations, time is saved and answers are more precise and accurate because the calculator carries the decimal values to additional places. The specialty calculator 10 overcomes the considerable prior setbacks of those before it and represents a patentable contribution to the art.

The present invention may be embodied in other specific forms without departing from the spirit or essential attributes thereof and accordingly, the described embodiments are to be considered in all respects as being illustrative and not restrictive, with the appended claims, rather than the foregoing detailed description, as indicating the scope of the invention as well as all modifications which may fall within a range of equivalency which is also intended to be embraced therein.

The invention claimed is:

1. A method for solving a plurality of formula-related function calculations and conversions commonly encountered in the machinist trade comprising the steps of
   a. providing a hand-held calculating apparatus having a visual display and a keyboard including one or more key groupings for selecting a specialized function for calculation:
   b. storing a plurality of pre-selected number of formula-related function calculations and conversions in said hand-held calculating apparatus that are individually selectable by depressing one of a corresponding number of function and conversion keys to initiate the selected function for calculation;
   c. initializing a specialized function calculation or conversion by selecting and depressing one of the plurality of function and conversion keys;
   d. causing one or more user prompts to appear on the visual display in a predetermined sequence for use in said selected function calculation;
   e. manually entering numerical information required for the selected function calculation in response to said user prompts and temporarily storing said numerical information;
   f. calculating said selected function using said temporarily stored numerical information and displaying a numerical result for said selected function on the visual display;
   g. providing one or more temporary memory locations for storing the numerical result of a previously completed selected function calculation and selectively storing said numerical result for said previously completed selected function calculation in said one or more temporary memory locations for later recall;

h. prompting the user by displaying a special character when previously stored numerical information is of the same type information required for use with a newly selected function calculation and recalling said previously temporarily stored numerical information of the same type for use in the newly selected function calculation.

2. The method of claim 1 comprising the additional steps of reviewing previously entered numerical information required for the selected function calculation, checking the accuracy of said numerical information for the current function calculation, and modifying said numerical information as necessary.

3. The method of claim 1 comprising the additional step of converting numerical information to be entered for use in the selected function calculation or numerical results of the selected function calculation between and among English and metric dimensional measuring systems and decimal and fractional values of said numerical information.

4. The method of claim 1 wherein the specialized function calculation is selected from the group of formula-related functions consisting of revolutions per minute, surface feet per minute, inches per minute, feed per tooth and cut-time.

* * * * *